United States Patent
Elogab et al.

(10) Patent No.: US 11,359,687 B2
(45) Date of Patent: Jun. 14, 2022

(54) BRAKE DUCT SYSTEM AND METHOD

(71) Applicant: OGAB LIMITED, Somerset (GB)

(72) Inventors: Osama Elogab, Somerset (GB); Hatem Elogab, Somerset (GB)

(73) Assignee: Ogab Limited, Somerset (GB)

( * ) Notice: Subject to any disclaimer, the term of this patent is extended or adjusted under 35 U.S.C. 154(b) by 42 days.

(21) Appl. No.: 16/724,280

(22) Filed: Dec. 21, 2019

(65) Prior Publication Data

US 2020/0124123 A1 Apr. 23, 2020

Related U.S. Application Data

(63) Continuation of application No. PCT/GB2018/051643, filed on Jun. 14, 2018.

(30) Foreign Application Priority Data

Jun. 23, 2017 (GB) .................................... 1710053

(51) Int. Cl.
*F16D 65/847* (2006.01)
*B60T 17/00* (2006.01)
*F16D 65/78* (2006.01)

(52) U.S. Cl.
CPC .......... *F16D 65/847* (2013.01); *B60T 17/002* (2013.01); *F16D 2065/787* (2013.01)

(58) Field of Classification Search
CPC .... F16D 65/847; F16D 65/827; F16D 65/807; F16D 2065/783; F16D 2065/786
See application file for complete search history.

(56) References Cited

U.S. PATENT DOCUMENTS

| 3,208,229 | A  | * | 9/1965 | Fulton | C03B 27/067 |
| | | | | | 55/455 |
| 8,562,023 | B2 | * | 10/2013 | Hino | B60C 23/18 |
| | | | | | 165/104.19 |
| 8,590,937 | B2 | * | 11/2013 | Hino | B60C 23/18 |
| | | | | | 165/104.19 |
| 9,586,449 | B2 | * | 3/2017 | Love | B60K 35/00 |

(Continued)

FOREIGN PATENT DOCUMENTS

| CN | 202783163 | | 3/2013 | | |
| DE | 3339760 | A1 * | 5/1984 | .......... | F16D 65/847 |
| DE | 102013223122 | | 4/2015 | | |

OTHER PUBLICATIONS

WIPO, International Search Report and Written Opinion in corresponding PCT application PCT/GB2018/051643, dated Oct. 2, 2018.

*Primary Examiner* — Thomas J Williams
(74) *Attorney, Agent, or Firm* — Ryan Alley IP

(57) ABSTRACT

The action of braking generates massive amounts of heat. It is known to install brake ducts 9, which channel air from the front of the vehicle to the brake discs 17. The air introduced by the brake ducts 9 is at an ambient temperature, much cooler than the brakes, and the airflow is closer to laminar (rather than turbulent) and continuously moves the hotter air away. This allows the brakes to shed heat at a faster rate and dramatically lowers the average operating temperature. The present invention provides a vortex tube 3 for supplying a stream of air 5 at a temperature substantially different from ambient temperature into brake ducts 9 to improve efficiency of the brake ducts 9.

4 Claims, 1 Drawing Sheet

(56) References Cited

U.S. PATENT DOCUMENTS

| | | | |
|---|---|---|---|
| 10,435,294 B2 * | 10/2019 | Leachman | B01J 19/2405 |
| 2002/0062650 A1 * | 5/2002 | Dukhan | H05K 7/20145 |
| | | | 62/324.2 |
| 2011/0220325 A1 * | 9/2011 | Hino | B60C 23/18 |
| | | | 165/104.34 |
| 2014/0239121 A1 * | 8/2014 | Kirkbride | B60T 5/00 |
| | | | 244/103 R |
| 2016/0176385 A1 * | 6/2016 | Wolf | F16D 65/847 |
| | | | 296/208 |
| 2016/0305974 A1 * | 10/2016 | Webster | F16D 65/84 |

* cited by examiner

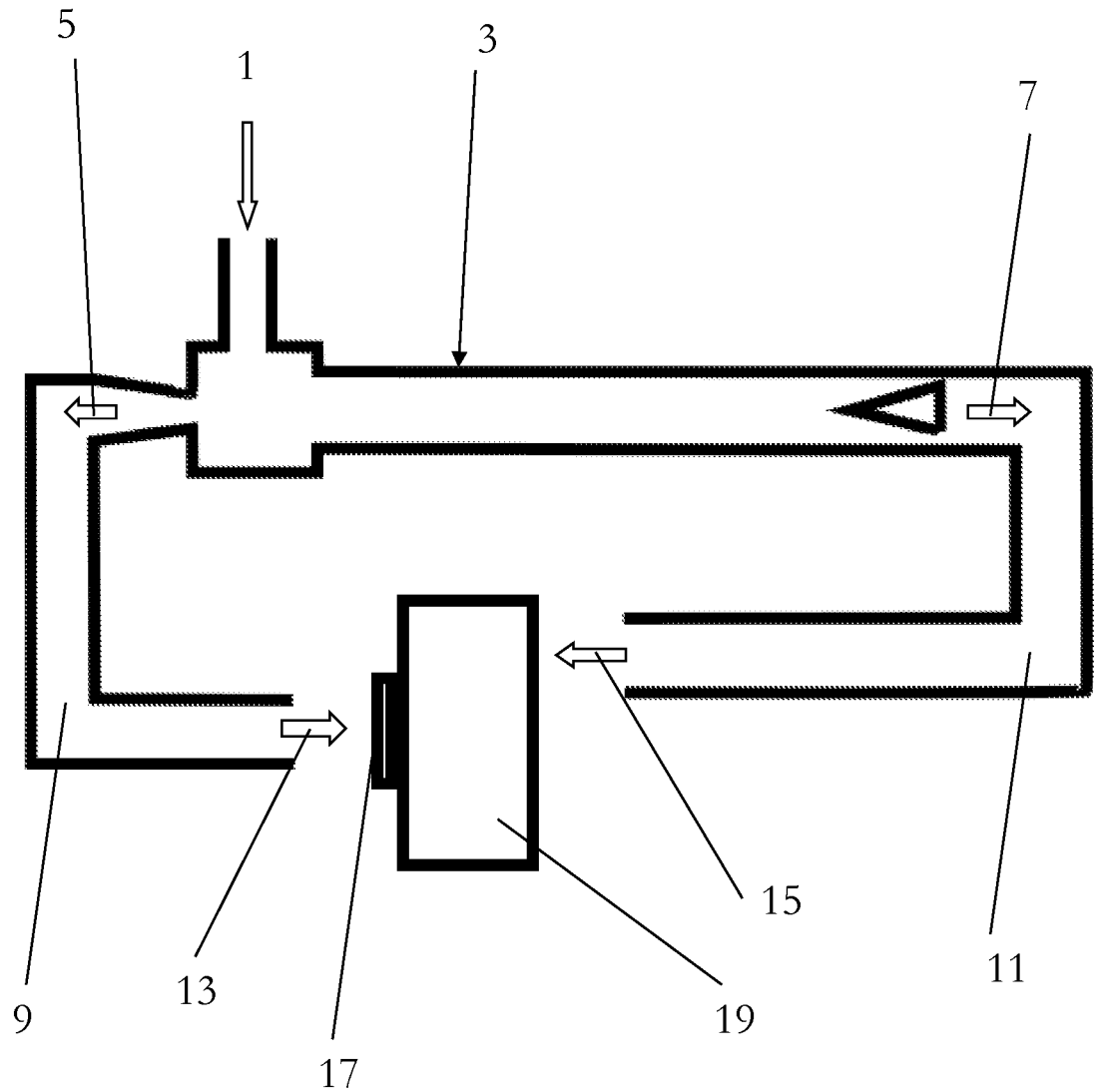

BRAKE DUCT SYSTEM AND METHOD

This application claims priority under 35 U.S.C. § 120 to, and is a continuation of, co-pending International Application PCT/GB2018/051643, filed Jun. 14, 2018 and designating the US, which claims priority to GB Application 1710053.8, filed Jun. 23, 2017, such GB Application also being claimed priority to under 35 U.S.C. § 119. These GB and International applications are incorporated by reference herein in their entireties.

BACKGROUND

The present invention relates generally to a brake duct system and a method of controlling the temperature of a brake system and finds particular, although not exclusive, utility in automotive and aeronautical braking systems.

The action of braking generates massive amounts of heat, and brake components have a relatively narrow temperature window within which they can operate; their performance degrades drastically when they exceed their maximum temperature ratings.

Brake rotors (i.e. brake discs) are usually designed to dissipate heat. Aerodynamic cooling of brake discs through convection is the primary mechanism by which the brake discs are cooled; however, in vehicles having a wheel well (such as cars) and in vehicles where the brake rotors are disposed within the barrel of the wheel, air around the brake discs is turbulent and relatively slow-moving (for instance when compared to the speed of the vehicle. This causes a heat build-up around the brake components and diminishes their ability to shed that heat.

It is known to install brake ducts, which channel air from a high pressure source (usually the front surface of the vehicle) to the brake rotor. The air introduced by the brake ducts is at an ambient temperature, much cooler than the brakes, and the airflow is closer to laminar (rather than turbulent) and continuously moves the hotter air away. This allows the brakes to shed heat at a faster rate and dramatically lowers the average operating temperature.

SUMMARY

Design and implementation of conventional brake duct systems focuses on three main considerations:

First, the air inlet of the brake duct system should be at a relatively high-pressure. Typically, this inlet is usually located at the front of the vehicle so that ram pressure of the vehicles movement will provide introduction of high pressure air into the inlet.

Secondly, the hose(s)/ducting for conveying air from the inlet to the brake disc(s) should allow a relatively unrestricted airflow from the inlet. A larger diameter (i.e. cross-sectional area for non-circular cross-sections) hose/duct allows for increased airflow, and airflow typically increases as a square of the diameter.

Thirdly, the outlet should be designed to introduce the air as close to the brake disc as possible, and at a precise orientation. Brake rotors are often designed to vent air from their centre radially outwards, so the outlet is often located as close to the centre as possible.

However, there is still room for improvement of such brake duct systems, as will be described below.

According to a first aspect of the present invention, there is provided a vehicle comprising: tyres; a braking system; and a brake duct system comprising: a first outlet configured to be disposable adjacent to the brake system; a second outlet configured to be disposable adjacent to the brake system; a first duct arranged to convey air to the first outlet; a second duct arranged to convey air to the second outlet; and a vortex tube having: an inlet arranged to collect air at a first temperature, and at a pressure substantially above atmospheric pressure; a high temperature outlet configured to supply a first stream of air at a second temperature substantially above the first temperature to the first duct; and a low temperature outlet configured to supply a second stream of air at a third temperature substantially below the first temperature to the second duct; wherein the first outlet is arranged to heat up the brake system and/or heat up the tyres.

The vehicle may be a car, van, lorry, motorcycle or any other similar vehicle. Alternatively, or additionally, the vehicle may be an aeroplane or other similar vehicle.

The or each outlet may be configured to introduce air substantially onto a brake disc, for example onto a first side and/or a second side of the brake disc, substantially onto a brake pad, substantially in front of and/or behind a brake pad, and/or substantially onto a wheel and/or tyre. The or each outlet may comprise a plurality of outlets, which may be configured to introduce air into a plurality of respective locations. Herein, references to 'the outlet' may be taken to be references to 'the first outlet', 'the second outlet' and/or 'the first and/or second outlets'.

The or each duct may comprise a plurality of ducts, and may comprise a hose. Herein, references to 'the duct' may be taken to be references to 'the first duct', 'the second duct' and/or 'the first and/or second duct'.

The vortex tube may comprise a Ranque-Hilsch vortex tube.

The inlet may be arranged to collect air from the front of the vehicle so that ram pressure of the vehicles movement will provide high pressure air into the inlet, Alternatively, a pump (e.g. an air pump) may supply air into the inlet. The pump may be electrically driven, or mechanically linked to the vehicle's crank shaft. However, in preferred embodiments, the pump may be driven by a turbo. That is, exhaust gases may drive a turbo that in turn is used to drive the pump for providing high pressure air into the inlet.

The duct may be configured to supply the first stream of air to a respective subset of the plurality of outlets. The duct may be configured to supply the second stream of air to a further respective subset of the plurality of outlets. The duct may be configured to supply the first and second stream of air to the same outlet/plurality of outlets, and/or an overlapping subset of the plurality of outlets. Each subset of the plurality of outlets may be arranged to provide a respective air stream to a respectively predetermined portion of the braking system.

The brake duct system could be employed to heat up the brake system in very cold conditions (for instance in which the brake system may freeze) and/or heat up the tyres in order to improve performance at the beginning of a race.

The brake duct system may be provided with a further outlet for conveying the first and/or second stream of air at the second and/or third temperature, respectively, to an alternative system. For example, the alternative may comprise an active drag reduction system, an internal cabin heater and/or air conditioning system, and/or tyre heater.

The vortex tube may be configured to supplying the second stream of air at the third temperature into the duct, for conveyance to the outlet.

The brake duct system may further comprise a controller configured to control supply of the stream of air from the vortex tube to the outlet.

The brake duct system may further comprise a temperature sensor configured to monitor a temperature of the brake system and the controller configured to control supply of the stream of air from the vortex tube to the outlet in response thereto.

In this way, the temperature sensor and controller may control the brake duct system to cool the brake system when at risk of over-heating, heat the brake system when at risk of freezing and/or heat the tyres.

The brake duct system may further comprise a braking sensor configured to monitor vehicle braking and the controller configured to control supply of the stream of air from the vortex tube to the outlet in response thereto.

In this way, the braking sensor and controller may control the brake duct system to cool the brake system during braking.

The controller may be configured to cease supply of the stream of air from the vortex tube to the outlet in response to cessation of braking.

The brake duct system may be configured to connect to an active drag reduction system. For example, the vortex tube may be arranged to supply a hot stream of air and/or a cool stream of air to an active drag reduction system, and the brake duct system may be configured to redirect such hot and/or cold streams of air from the active drag reduction system in response to a temperature determined by the temperature sensor above/below one or more threshold temperatures, and/or in response to braking determined by the braking sensor.

In this way, as drag reduction is not required during braking, air flow from the drag reduction system may be diverted to the brake duct system during braking.

An active drag reduction system may be employed on a vehicle configured such that, when moving at a speed above a predetermined threshold speed, at least one turbulent and/or low pressure region is formed adjacent to the vehicle. An active drag-reduction system may be configured to reduce the at least one turbulent and/or low pressure region when activated, for instance by injecting warm air and/or cool air toward the turbulent/low pressure region.

An active drag reduction system may comprise at least one propelling nozzle located adjacent to the at least one region; and a system for providing gas to the at least one nozzle for expulsion into the at least one region, for instance as described in WO2016/139472.

An active drag-reduction system may comprise: at least one first fluid outlet located on the vehicle adjacent to the at least one region; at least one second fluid outlet located on the vehicle adjacent to the at least one region and spaced from the at least one first fluid outlet; and a fluid supply system configured to: provide fluid at a first pressure and/or first ejection velocity to the at least one first fluid outlet; and provide fluid at a second pressure and/or second ejection velocity to the at least one second fluid outlet, wherein the second pressure and/or second ejection velocity is greater than the first pressure and/or first ejection velocity, respectively.

According to a second aspect of the present invention, there is provided a method of controlling the temperature of a brake system, the method comprising: providing a brake system; providing the brake duct system of the first aspect; and controlling supply of the stream of air from the vortex tube to the outlet.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference FIGURES quoted below refer to the attached drawings.

BRIEF DESCRIPTION OF THE DRAWINGS

FIG. 1 is a schematic representation of a brake duct system.

DETAILED DESCRIPTION

The present invention will be described with respect to certain drawings but the invention is not limited thereto but only by the claims. The drawings described are only schematic and are non-limiting. Each drawing may not include all of the features of the invention and therefore should not necessarily be considered to be an embodiment of the invention. In the drawings, the size of some of the elements may be exaggerated and not drawn to scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that operation is capable in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that operation is capable in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "an embodiment" or "an aspect" means that a particular feature, structure or characteristic described in connection with the embodiment or aspect is included in at least one embodiment or aspect of the present invention. Thus, appearances of the phrases "in one embodiment", "in an embodiment", or "in an aspect" in various places throughout this specification are not necessarily all referring to the same embodiment or aspect, but may refer to different embodiments or aspects. Furthermore, the particular features, structures or characteristics of any embodiment or aspect of the invention may be combined in any suitable manner, as would be apparent to one of ordinary skill in the art from this disclosure, in one or more embodiments or aspects.

Similarly, it should be appreciated that in the description various features of the invention are sometimes grouped together in a single embodiment, FIGURE, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Moreover, the description of any individual drawing or aspect should not necessarily be considered to be an embodiment of the invention. Rather, as the following claims reflect, inventive aspects lie in fewer than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some features included in other embodiments, combinations of features of different embodiments are meant to be within the scope of the invention, and form yet further embodiments, as will be understood by those skilled in the art. For example, in the following claims, any of the claimed embodiments can be used in any combination.

In the description provided herein, numerous specific details are set forth. However, it is understood that embodiments of the invention may be practised without these specific details. In other instances, well-known methods, structures and techniques have not been shown in detail in order not to obscure an understanding of this description.

In the discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The use of the term "at least one" may mean only one in certain circumstances.

The principles of the invention will now be described by a detailed description of at least one drawing relating to exemplary features of the invention. It is clear that other arrangements can be configured according to the knowledge of persons skilled in the art without departing from the underlying concept or technical teaching of the invention, the invention being limited only by the terms of the appended claims.

FIG. 1 shows a brake duct system that receives high pressure air at an inlet 1, which is supplied to a vortex tube 3. As is well-known, the high pressure air is split into a cold stream 5 and a hot stream 7, each of which is conveyed by respective ducting 9,11 to respective outlets 13,15. The cold stream 5 is directed onto a brake system 17 of a wheel, while the hot stream 7 is directed onto the tyres 19 of the wheel.

The invention claimed is:

1. A vehicle comprising:
   tires;
   a brake system; and
   a brake duct system comprising:
      a first outlet configured to be disposable adjacent to the tires;
      a second outlet configured to be disposable adjacent to the brake system;
      a first duct arranged to convey air to the first outlet or the second outlet;
      a second duct arranged to convey air to the first outlet or the second outlet; and
      a vortex tube having:
         an inlet arranged to collect air at a first temperature, and at a pressure above atmospheric pressure;
         a high temperature outlet configured to supply a first stream of air at a second temperature above the first temperature to the first duct; and
         a low temperature outlet configured to supply a second stream of air at a third temperature below the first temperature to the second duct; and
      a controller configured to selectively control supply of the first stream of air from the vortex tube to the first outlet or the second outlet, and to selectively control supply of the second stream of air from the vortex tube to the first outlet or second outlet;
      wherein the first outlet is arranged to heat up and cool the tires, and wherein the second outlet is arranged to heat up and cool the brake system.

2. The brake duct system of claim 1, further comprising a temperature sensor configured to monitor a temperature of the brake system and the controller configured to control supply of the streams of air from the vortex tube to the outlets in response thereto.

3. The brake duct system of claim 1, further comprising a braking sensor configured to monitor vehicle braking and the controller configured to control supply of the streams of air from the vortex tube to the outlets in response thereto.

4. A method of controlling the temperature of a brake system, the method comprising:
   providing the brake system of claim 1;
   providing the brake duct system of claim 1; and
   controlling supply of the streams of air from the vortex tube to the outlets.

* * * * *